United States Patent
Grech et al.

(10) Patent No.: US 6,632,363 B1
(45) Date of Patent: Oct. 14, 2003

(54) HYDROPHOBIC COMPOSITIONS AND METHODS OF USE IN WATER APPLICATIONS

(75) Inventors: Nigel M. Grech, Reedley, CA (US); Ming Tsuan Lin, San Gabriel, CA (US); Shinn Liang Lin, San Gabriel, CA (US)

(73) Assignee: Grotek, Inc., Alhambra, CA (US)

( * ) Notice: Subject to any disclaimer, the term of this patent is extended or adjusted under 35 U.S.C. 154(b) by 0 days.

(21) Appl. No.: 09/848,102

(22) Filed: May 2, 2001

(51) Int. Cl.$^7$ .................................................. C02F 3/00
(52) U.S. Cl. ....................... 210/610; 210/616; 210/747; 435/262; 435/264
(58) Field of Search ................................ 210/610, 616, 210/747; 435/262, 264

(56) References Cited

U.S. PATENT DOCUMENTS

| | | | | |
|---|---|---|---|---|
| 5,124,149 A | | 6/1992 | Shapiro et al. | |
| 5,236,589 A | * | 8/1993 | Torrance | 210/616 |
| 5,486,292 A | * | 1/1996 | Bair et al. | 210/616 |
| 5,580,770 A | * | 12/1996 | DeFilippi | 210/616 |
| 5,658,795 A | * | 8/1997 | Kato et al. | 435/262 |
| 6,025,152 A | * | 2/2000 | Hiatt | 435/262 |
| 6,057,268 A | * | 5/2000 | Mehta | 435/262 |
| 6,121,038 A | * | 9/2000 | Kirschner | 210/616 |
| 6,322,782 B1 | * | 11/2001 | Walker et al. | 435/262 |
| 6,403,364 B1 | * | 6/2002 | Hince | 210/747 |

OTHER PUBLICATIONS

H.D. Burges, "Formulation of Microbial Biopesticides" (1998).

C.M. Inoffo et al., "Microencapsulation and Ultraviolet Protectants to Increase Sunlight Stability of an Insect Virus", Journal of Economic Entomology 64(4):850–853 (1971).

A. Krieg, "Photoprotection Against Inactivation of *Bacillus thuringiensis* Spores by Ultraviolet Rays", Journal of Invertebrate Pathology 25(2):267–268 (1975).

R.S. Bhatnagar, et al., "Survival of Rhizobium Japonicum in Charcoal Bentonite Based Carrier", Current Science 51(8):430–432(1982).

G.F. Joye, et al., "Biological Control of Aquatic Weeds with Plant Pathogens", ACS Symposium Series 197:154–174.

R. Autio, et al., "Factorial experiments used to analyse nutrient and grazing control of phyto–and bacterioplankton", Ergebnisse der Limnologie Advances in Limnology 31:253–263 (1988).

Shigeo Endo, et al., "Conditions Influencing the Growth-Promoting/Sustaining Effects of Carbon Material in Agar Plates," Nippon Nogeikagaku Kaishi 73(11):1181–1186 (1999).

Sang–Hong Yoon, et al., "Production of Biopolymer Flocculant by *Bacillus subtilis* TB11", Microbiology and Biotechnology 8(6): 606–612 (1998).

R. Castro–Franco, et al., "An alternative bioinsecticide formulation to encapsulate *Bacillus thuringiensis* = toxin and extracts of Agave lecheguilla Torr. for the control of Spodoptera frugiperda Smith", International Journal of Experimental Botany, 62 (1/2): 71–77 (1998).

Michio Matsuhashi, et al., "Growth–promoting effect of carbon material upon bacterial cells propagating through a distance", J. Gen. Appl. Microbiol. 43:225–230 (1997).

Takashi Fujita, et al., Description of *Bacillus carboniphilus* sp. Nov. , International Journal of Systematic Bacteriology, 46(1):116–118 (1996).

Michio Matsuhashi, et al., "Studies on Carbon Material Requirements for Bacterial Proliferation and Spore Germination under Stress Conditions: a New Mechanism Involving Transmission of Physical Signals", Journal of Bacteriology, 177(3):688–693 (1995).

Nicola D. Williams, et al., "Conditions suitable for the recovery of biocide–treated spores of *Bacillus subtilis*", Microbios 74:121–129 (1993).

A.O. Ejiofor, et al., "Preparation of a flowable liquid bacterial insecticide based on *Bacillus sphaericus*". World Journal of Microbiology and Biotechnology, 7:596–599 (1991).

S. Gaind, et al., "Shelf life of phosphate–solubilizing inoculants as influenced by type of carrier, high temperature, and low moisture", Canadian Journal of Microbiology, 36(12):846–849 (1990).

Junkei Kawa, "Adriamycin absorbed to activated carbon particles: A new drug delivery system for targeting cancer chemotherapy", Journal of Kyoto Prefactural University of Medicine, 98(5):517–532 (1989).

P.J. Van Dijck, et al., "Activated Charcoal and Microflora in water treatment", The Journal of the Internation Association on Water Pollution Research & Control, Water Research 18(11):1361–1364 (1984).

Shin–Ichi Okuda, "Treatment of Lipid–Containing Wastewater Using Bacteria Which Assimilate Lipids", Journal of Fermentation and Bioengineering, 71(6):424–429 (1991).

R.G. Knepper, et al., "Aerially Applied, Liquid *Bacillus thuringiensis* Var. Israelensis (H–14) for Control of Spring Aedes Mosquitoes in Michigan", Journal of the American Mosquito Control Association, 7(2):307–309 (1991).

Babjide A. Matanmi, et al., "Fate and Persistence of *Bacillus sphaericus* Used as a Mosquito Larvicide in Dairy Wastewater Lagoons", Journal of the American Mosquito Control Association, 6(3):384–389 (1990).

(List continued on next page.)

Primary Examiner—Christopher Upton
(74) Attorney, Agent, or Firm—Michael J. Wise; Perkins Coie LLP

(57) ABSTRACT

Hydrophobic compositions and methods for using hydrophobic compositions in improving the water quality of water applications. The hydrophobic composition comprising hydrophobic carriers and microbial agents and wherein the hydrophobic composition distributes the microbial agent efficiently and uniformly to the water application and target plants and/or organisms.

16 Claims, No Drawings

OTHER PUBLICATIONS

H. Danana Goud, et al., "Treatment of DMT (Kimethyl Terephthalate) Industry Waste Water Using Mixed Culture of Bacteria and Evaluation of Treatment", Journal of Environmental Biology, 11(1):15–26 (1990).

Maria Luisa Garcia, et al., "Effect of heat and ultrasonic waves on the survival of two strains of *Bacillus subtilus* ", Journal of Applied Bacteriology, 67:619–628 (1989).

Greg Blank et al., "Heat Sensitization of *Bacillus substilis* Spores by Selected Spices", Journal of Food Safety, 9:83–96 (1988).

Toshihko Ogawa, et al., "Growth Inhibition of *Bacillus subtilis* by Basic Dyes", Environmental Contamination and Toxicology, 40(4):545–552 (1988).

James C. MacDonald, et al., "Evaluation of Bacillus as a practical means for degradation of geosmin", Applied Microbiology and Biotechnology 25(4):392–395 (1987).

Catherine N. Mulligan, et al., "Pressate from Peat Dewatering as a Substrate for Bacterial Growth", Applied and Environmental Microbiology, 50(1):160–162 (1985).

McLaughlin, et al., "Distribution of a Flowable Concentrate Formulation of *Bacillus thuringiensis* Serotype H–14 During Irrigation of Rice Fields as a Function of the Quantity of Formulation", Mosquito News, Journal of the American Mosquito Control Association, 44(3):330–335 (1984).

P.J. Van Dijck, et al., "Activated Charcoal and Microflora in Water Treatment", Water Research, The Journal of the International Association on Water Pollution Research & Control, 18(11):1361–1364.

* cited by examiner

HYDROPHOBIC COMPOSITIONS AND METHODS OF USE IN WATER APPLICATIONS

FIELD OF THE INVENTION

The present invention relates to the field of hydrophobic compositions and methods of use in water applications.

BACKGROUND OF THE INVENTION

Microbes and microbial preparations are becoming increasingly important and effective in combating pests and diseases. One of the most important factors in the efficacy of microbial control of pests or diseases is the application and distribution of the microbes to the targeted pest or disease. Current techniques for the application and distribution of microbes to water-related applications are deficient and hinder the effectiveness of the application and distribution of the microbes.

In applications to bodies of water, lakes, rivers, streams, canals, ponds, tanks, reservoirs, and water films on the surface of plants it is difficult to evenly apply microbes over the entire surface area of the body of water or plant surface and throughout the water columns beneath the water surface. For example, it is difficult to control algae blooms, which normally occur in the top layers of water, unless there is effective distribution of the microbes over the surface layers followed by adequate movement of the microbes into the upper water layers where the algae are residing.

Currently, the following methods are employed to control algae blooms and other unwanted plants and organisms. One method involves the use of chemical poisons. For example, the most commonly used algaecides include copper sulfate and diuron which have detrimental environmental impact, are regulated by the EPA as well as state agencies, require expert handling, and are considered pollutants. Their application often requires the use of a boat or other device to deliver the pesticide to the target organism as persons must spray the treatment directly onto the target organism or plant. This application is very labor intensive, time consuming, and a danger to persons applying the product. These and other pesticides, herbicides, and pollutants for the control of algae or other noxious plants and organisms are constantly under heavy scrutiny by municipal, state, and federal regulators nationally.

Another current method involves the use of colorings and shadings that provide limited control of the targeted organism or plant through prevention (blocking sunlight that is an essential stimulant for many algae that thrive on photosynthesis). Consequently, beneficial and ornamental water plants requiring sunlight are also deprived of needed light and their performance is also inhibited. Additionally, water clarity is sacrificed and unnatural colored water is created by the dyes, which is undesirable in many circumstances.

Another method involves the application of ultra-violet light in the form of a pre-filter to the area water gardening and koi ponds. Ultra-violet filtration, as it is commonly called, kills beneficial and bad bacteria alike, creating a pond more reliant on chemical fixes since natural pond balancing, nitrogen fixing, and micro-flora are destroyed. Additionally, ultra-violet filtration can not be practically applied to larger bodies of water or naturally sustaining bodies of water.

Another current method involves microbial inoculation, which has generally taken two forms, that of a liquid solution of microbes and a granular blend. Neither form offers an effective distribution method. Extensive mechanical agitation is required in order to distribute a liquid microbial inoculate throughout a body of water. Without extensive mechanical agitation, these liquid microbial formulas tend to remain concentrated at the origin of application. Additionally, liquid microbial formulas with viscosities that are greater or less than water will tend to hover or sink in a specific location. The other form of microbial inoculate currently available is granular. These granular formulas are typically similar in weight to that of beach sand. When introduced into the treatment waters, these granular formulations fall directly to the bottom. Only a very tiny percentage of the granular formulation (typically in the form of wheat germ) is left on the surface immediately following treatment. This method of granular microbial inoculation is largely ineffective, as the beneficial microbes are not effectively nor efficiently delivered to the target organism (alga, fungi, weeds, diseased fish, etc).

Each of the methods described above are deficient in their effectiveness since the composition applied to the algae, noxious weed, or target organism is concentrated at the origin of application and the poisons, antibiotics, or microbes are not evenly distributed. Further, since the application of the composition is limited to the localized area of application, only those algae or other plants or organisms residing in that localized area of the body of water will be treated sufficiently with the correct dosage. The target organisms residing in the adjacent water columns will not be treated as effectively. Thus, the current methods are inefficient for the treatment of algae, plants, fish, or fungi in water applications.

Compositions and methods for delivering microbes to water applications uniformly and efficiently over the water surface and down through the water column for the treatment of pests or diseases would offer substantial benefits over the current techniques. Accordingly, an object of this invention is a composition for use in water applications, wherein the composition distributes microbes uniformly and efficiently over a water surface and down through the water column. Another object of the present invention is a method for applying microbes uniformly and efficiently over a water surface and down through the water column. Another object of the present invention is to deliver microbes proportionately to the target alga, weeds, or organisms by blanketing the target pest effectively with the microbe.

SUMMARY OF THE INVENTION

An object of the present invention is to provide a composition and method by which microbes can be uniformly and efficiently distributed over a water surface and released into the body of water.

One aspect of the invention is a hydrophobic composition used for the delivery of a microbial agent to water applications comprising a hydrophobic carrier and a microbial agent. Another aspect of the invention is a method of administering a microbial agent to a water application uniformly and efficiently by introducing a hydrophobic composition containing a microbe to the water application and delivering it to a target plant or organism. Another aspect of the invention is a method for improving the water quality in a water application by introducing hydrophobic compositions to the water application. Another aspect of the invention is a method for improving the water quality in a water application by introducing hydrophobic compositions containing strains of *Bacillus subtilis* to the water application.

DETAILED DESCRIPTION OF THE PREFERRED EMBODIMENTS

This invention relates to compositions and methods for uniformly and efficiently delivering microbial agents to water applications.

A preferred aspect of the invention is a hydrophobic composition for effectively distributing a microbial agent to a water application comprising a hydrophobic carrier and a microbial agent. A preferred hydrophobic carrier is preferably selected from a group comprising carbon minerals, leonardite, plastic, wood powder, plant materials, clay and combinations thereof. The carbon minerals are preferably selected from a group comprising coal, charcoal, graphite, carbon black, oil, straw and combinations thereof. Most preferably, the hydrophobic carrier comprises activated carbon or charcoal specifically designed for distribution onto and into water applications. The carbon formulations also confer UV protection to the microbial agent during exposure to sunlight and act as an inoculum source for the microbial agent as it passes into the liquid medium. Carbon in various forms has been used in commercial water treatment previously, but as a filter or absorbent. The hydrophobic properties of the hydrophobic composition allow the composition to resist mixing with the water and instead form a thin film that rapidly disperses over the water surface resulting in its effective application to the water surface. Accordingly, in addition to the preferred hydrophobic carriers, one skilled in the art will appreciate that any hydrophobic or carbon composition may be employed as a hydrophobic carrier.

As used herein, a microbial agent comprises fungi, bacteria, nematodes, protozoan or combinations thereof which are effective in treating target pests or diseases. The target pests or diseases include, but are not limited to, various forms of algae and leaf diseases. Preferably the microbial agent comprises the genus Bacillus. Most preferably, the microbial agent comprises various strains of *Bacillus subtilis*. In a preferred embodiment, the microbial agent is formulated onto the hydrophobic carrier to produce a material with about $4.5 \times 10^6$ cfu/g of hydrophobic composition to about $4.5 \times 10^{10}$ cfu/g of hydrophobic composition.

As used herein, a water application includes bodies of water, lakes, rivers, canals, ponds, tanks, reservoirs and water films on the surface of plants. As would be appreciated by those of skill in the art, the present invention may be used in similar water applications where the uniform and efficient distribution of a microbial agent is desired.

In another aspect of the invention, the hydrophobic composition may also include a mineral fertilizer. The mineral fertilizer allows the hydrophobic composition to be applied to water films on the surface of plants, such as commercial turf. The hydrophobic composition may be added to a mineral fertilizer for application to commercial turf and similar applications. In this aspect of the invention, the hydrophobic composition may also be applied to the surface of water in the form of a water-soluble bag for use as an algaecide for blue-green algae (cyanobacterium), microscopic algae, filamentous algae, string algae, hair algae, and blanket weed.

Another aspect of the present invention is a method of delivering microbes to a water application uniformly and efficiently comprising, the step of applying a hydrophobic composition to a water application wherein the hydrophobic composition comprises a hydrophobic carrier and a microbial agent. In addition to forming a thin uniformly distributed film over the water surface, the microbial agents may be released into the body of water and move downward through the primary regions where the target pests or diseases are located during and after surface distribution. The microbial agent then interacts with the target pests or diseases and the hydrophobic carrier serves as a reservoir for the microbial agent. In the case of bacteria, the hydrophobic carrier provides a matrix for further growth.

Another aspect of the invention is a method for improving the water quality of a water application. In a preferred embodiment of the invention a hydrophobic composition is introduced to the water application. The hydrophobic composition disperses rapidly as a thin film over the surface of the water application, and downward through the primary regions of the water column. The microbial agents of the hydrophobic composition are released into the water application, thereby treating and improving the water quality of the water application. In further aspects of the invention, the hydrophobic compositions treat and improve water quality by controlling algae growth, de-odorizing the water application, suppressing water eutrophication, and reducing total suspended solids, ammonia, free nitrates and phosphates in the solution of water applications. The hydrophobic compositions of this aspect of the invention are delivered at rates ranging from about 0.1 g/m$^2$ to about 1000 g/m$^2$, most preferably from about 1 g/m$^2$ to about 1.5 g/m$^2$. The hydrophobic composition may also be delivered at rates ranging from about 100 cfu/m$^2$ to about $10 \times 10^{10}$ cfu/m$^2$.

In another preferred embodiment of the invention, a hydrophobic composition comprising various strains of *Bacillus subtilis* is formulated with charcoal to produce a hydrophobic composition with about $4.5 \times 10^6$ cfu/g of hydrophobic composition to about $4.5 \times 10^{10}$ cfu/g of hydrophobic composition. The hydrophobic composition may be applied to water applications to control algae growth, de-odorize the water application, suppress water eutrophication, and reduce total suspended solids, ammonia, free nitrates and phosphates in the water applications whereby the hydrophobic composition is efficiently and uniformly dispersed over the surface of and into the water application.

In another aspect of the invention, the hydrophobic composition may be supplemented with ground cotton stubble.

In another aspect of the invention, *Bacillus subtilis* is used to control algae growth and improve water quality in water applications. Another embodiment of the invention is a method for treating water and controlling algae growth in water applications comprising the step of applying *Bacillus subtilis* to a water application.

EXAMPLE 1

Example 1 illustrates the effect of a hydrophobic composition in an algae infested water application.

Various strains of *Bacillus subtilis* were formulated with charcoal to produce a hydrophobic composition with $4.5 \times 10^8$ cfu/g of hydrophobic composition. The hydrophobic composition was then applied to the surface of an algae infested pond in Riverside, Calif., USA at a range of rates from 0.1–1.5 g/m$^2$. The water quality of the pond was monitored over a ten day period. On certain days during the ten day period, the algae in the pond was rated from 0 to 5, with 0 indicating the worst water quality and a high incidence of algae and 5 indicating good water quality and no incidence of algae. Table 1 illustrates the results of the study.

As the rates of application of the formulation increased, the water quality increased. In addition, generally, as the rates of formulation increased, the water quality increased at faster rates.

TABLE 1

| Rate of Formulation | Day 0 | Day 3 | Day 5 | Day 7 | Day 10 |
|---|---|---|---|---|---|
| 0 g | 2 | 2 | 2 | 2 | 2 |
| 0.1 g | 2 | 2 | 2 | 2 | 2 |
| 0.5 g | 2 | 2 | 3 | 3 | 3 |
| 1 g | 2 | 2 | 2 | 3 | 4 |
| 1.5 g | 2 | 2 | 4 | 4 | 5 |

0 = Worst Water Quality, high incidence of algae
5 = Water Quality good, no incidence of algae.

EXAMPLE 2

Example 2 illustrates the suppression of algae in hydroponic systems.

The hydrophobic composition of Example 1 was supplemented with ground cotton stubble. The composition was then applied to the drainage canals of a seven acre hydroponics facility in Florence, Oreg., USA at a rate of 1.5 g/m$^2$. The water quality of the hydroponics facility increased at a dramatic rate after introduction of the hydrophobic composition. The results of the study are illustrated in Table 2.

TABLE 2

| Treatment Rate | Day 0 | Day 3 | Day 7 | Day 10 |
|---|---|---|---|---|
| 1.5 g/m$^2$ | 1 | 2.5 | 4 | 4.5 |

0 = Worst Water Quality, high incidence of algae
5 = Water Quality good, no incidence of algae.

EXAMPLE 3

Example 3 illustrates the uniform distribution of the hydrophobic composition in a water application.

A water column was set up in Reedley, Calif., USA. Various strains of *Bacillus subtilis* were formulated with charcoal to produce a hydrophobic composition with 4.5× 10$^8$ cfu/g of hydrophobic composition. The hydrophobic composition was then applied to the center of the surface of water as a small pile, at a range of rates from 0.1–1.5 g/m$^2$. The rate at which the material spread across the water surface and through the column is described in Table 3. As Table 3 illustrates, the hydrophobic composition disperses rapidly over a water surface and downwards through the water column.

TABLE 3

| | Time to percentage coverage | | | |
|---|---|---|---|---|
| | 25% | 50% | 75% | 100% |
| Water Surface | 0.4 min | 1.25 min | 2.3 min | 3.5 min |
| Water Column | 4.75 min | 7.5 min | 9.5 min | 12.3 min |

EXAMPLE 4

Example 4 illustrates the effect of hydrophobic compositions on commercial turf.

The hydrophobic composition of Example 1 was applied to commercial turf at Morro Bay, Calif., USA at rates of 2 g/m$^2$ and 4 g/m$^2$. The alga incidence and the incidence of certain foliage diseases were measured 14 days later. The turf health was also measured, with 0 indicating healthy turf and 5 indicating unhealthy turf. The results of this study are illustrated in Table 4. As the rates of application of the formulation increased, the incidence of algae and leaf disease decreased, while the health of the turf increased.

TABLE 4

| Rates | Algae Incidence | Leaf Disease Incidence* | Turf Health** |
|---|---|---|---|
| Control | 15% increase | 22% increase | 2.3 |
| 2 g/m$^2$ | −33% | −55% | 1.5 |
| 4 g/m$^2$ | −65% | −75% | 1 |

*Main disease of turf at this site was leaf anthracnose caused by Collectotrichum.
**Turf health Index 0 = no necrotic patches, growth excellent, color excellent.
5 = Dead

EXAMPLE 5

Example 5 illustrates the use of hydrophobic compositions in aquariums and fish tanks.

Algae growth in aquariums and fish tanks are a common problem. The hydrophobic compositions of this invention may be applied to aquariums and fish tanks to treat the water and thus control the algae growth.

The hydrophobic composition of Example 1 may be placed on the water surface of an aquarium or fish tank. The hydrophobic composition rapidly disperses as a thin film over the water surface, then this film enters the liquid phase as a suspension. The *Bacillus subtilis* are being released into the body of water during dispersal over the surface of water and as the composition moves downwards through the water column to treat the algae growth in the aquarium or fish tank.

During treatment of the aquarium or fish tank for algae growth, the fish and any other aquatic/marine life forms do not need to be removed from the aquarium or fish tank. The microbial agents and hydrophobic carriers of the hydrophobic composition are not harmful to aquatic/marine life or wildlife, unlike other methods that employ chemicals or pesticides. The methods of this invention that employ microbial agents are environmentally safe.

EXAMPLE 6

Example 6 illustrates the use of hydrophobic compositions in feeding troughs for animals.

The hydrophobic composition of Example 1 may be introduced into the feeding troughs of animals. The hydrophobic composition controls the growth of target pests and diseases. Further, the hydrophobic composition is not harmful to the animals. As a result, the frequency with which the feeding troughs need to be cleaned and replaced may be decreased.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for improving the water quality of a water application comprising the steps of:
   introducing a hydrophobic composition to the water application, wherein the hydrophobic composition comprises a hydrophobic carrier and a microbial agent, wherein the hydrophobic composition distributes efficiently and uniformly over the surface of the water application and causes the microbial agent to be released efficiently and uniformly over the surface of and downward into the water application, and wherein the hydrophobic composition improves the water quality of the water application.

2. The method of claim 1, wherein the hydrophobic composition reduces nitrates and phosphates in a water application.

3. The method of claim 1, wherein the hydrophobic composition reduces suspended solids and dead organic matter in a water application.

4. The method of claim 1, wherein the hydrophobic composition deodorizes a water application.

5. The method of claim 1, wherein the hydrophobic composition controls the growth of algae in a water application.

6. The method of claim 1, wherein the hydrophobic carrier confers UV protection to the microbial agent.

7. The method of claim 1, wherein the hydrophobic carrier provides a matrix for further growth of the microbial agent.

8. The method of claim 1, wherein the hydrophobic composition is applied to the water application at rates of about 0.1 g/m$^2$ to about 1000 g/m$^2$.

9. The method of claim 1, wherein the hydrophobic composition is applied to the water application at rates of about 100 cfu/m$^2$ to about $10 \times 10^{10}$ cfu/m$^2$.

10. The method of claim 1, wherein said hydrophobic carrier comprises carbon minerals, plastics, wood powder, plant materials, clays or combinations thereof.

11. The composition of claim 10, wherein said carbon minerals are selected from a group consisting of coal, charcoal, activated charcoal, graphite, carbon black, oil, straw or combinations thereof.

12. The method of claim 1, wherein said microbial agent comprises fungi, bacteria, nematodes, protozoan and combinations thereof.

13. The method of claim 12, wherein the bacteria comprises *Bacillus subtilis*.

14. The method of claim 1, wherein the hydrophobic composition comprises about $4.5 \times 10^6$ cfu/g of hydrophobic composition to about $4.5 \times 10^{10}$ cfu/g of hydrophobic composition.

15. A method for controlling algae growth in a water comprising the steps of:

introducing a hydrophobic composition comprising charcoal and *Bacillus subtilis* to the water application at a rate of about 0.1 g/m$^2$ to about 1000 g/m$^2$, wherein the hydrophobic composition distributes efficiently and uniformly over the surface of the water application and causes the *Bacillus subtilis* to be distributed and released efficiently and uniformly over the surface of and downward into the water application, and wherein the hydrophobic composition controls the amount of algae in the water application.

16. A method for delivering microbes efficiently and uniformly to a water application comprising:

introducing the hydrophobic composition to the water application, wherein the hydrophobic composition comprises a hydrophobic carrier and a microbial agent, and wherein said hydrophobic composition distributes efficiently and uniformly over the surface of the water application and causes the microbial agent to be distributed and released efficiently and uniformly over the surface of and downward into the water application.

* * * * *